United States Patent [19]

Okatani

[11] Patent Number: 5,418,775
[45] Date of Patent: May 23, 1995

[54] PRESSURIZED DISK DRIVE INTERIOR FOR AIR COOLING AND DUST PREVENTION

[75] Inventor: Hideki Okatani, Odawara, Japan
[73] Assignee: NSK Ltd., Tokyo, Japan
[21] Appl. No.: 113,084
[22] Filed: Aug. 30, 1993
[30] Foreign Application Priority Data Aug. 31, 1992 [JP] Japan .................. 4-232223

[51] Int. Cl.$^6$ ............................................. G11B 33/14
[52] U.S. Cl. .................. 369/275.5; 369/72; 369/75.1; 360/97.02; 360/97.03
[58] Field of Search .......... 360/97.02, 97.03; 369/72, 75.1, 275.5, 71, 292, 128

[56] References Cited

U.S. PATENT DOCUMENTS

| 4,642,715 | 2/1987 | Ende | 360/97.02 |
| 4,680,656 | 7/1987 | Manzke et al. | 360/97.03 |
| 5,255,137 | 10/1993 | Suzuki | 360/97.02 |
| 5,255,256 | 10/1993 | Engler et al. | 360/97.02 |
| 5,301,178 | 4/1994 | Okabe et al. | 360/97.02 |
| 5,303,220 | 4/1994 | Whitaker et al. | 369/71 |

FOREIGN PATENT DOCUMENTS 3-225691 10/1991 Japan .

Primary Examiner—Georgia Y. Epps
Assistant Examiner—Kim-Kwok Chu
Attorney, Agent, or Firm—Evenson, McKeown, Edwards & Lenahan

[57] ABSTRACT

The interior of a casing or housing 8 for an optical disk drive apparatus is divided into a first space S1 where a optical head 3, an optical disk loading mechanism 7 and a means 15 for increasing the pressure to prevent the entrance of dust and dirt into the first space S1 from the outside are positioned and a second space S2 where an electrical equipment section 5, a power supply section 6 and a motor-driven fan 9 for cooling the second space S2 are positioned, whereby it is possible to effectively cool the electrical equipment section 5 and the power supply section 6 in the second space S2, as well as to prevent the optical head 3 in the first space S1 from being contaminated by dust and dirt, so that the operation of this optical disk drive apparatus can be effectively maintained in a stable condition.

8 Claims, 1 Drawing Sheet

PRESSURIZED DISK DRIVE INTERIOR FOR AIR COOLING AND DUST PREVENTION

BACKGROUND OF THE INVENTION

1. Field of the Invention

The present invention relates to an optical disk drive apparatus, and, in particular, to an optical disk drive apparatus wherein dirt and dust in the ambient environment effectively is prevented from entering the interior of the apparatus while the interior of the apparatus is effectively cooled thereby reducing the undesirable effects from dust and heat.

2. Description of the Prior Art

A conventional disk drive apparatus has a configuration similar to, for example, that illustrated in FIG. 2. This disk drive apparatus is provided with a casing or housing 8 and a main chassis 1, on which a spindle motor device 2 and a mechanism 4 for shifting the optical head 3 are mounted. These components are arranged together with an electrical equipment section 5, a power supply section 6, and a mechanism 7 for loading a disk D in a single space defined by the casing 8 and the main chassis 1.

An opening 10 for inserting and removing a disk cartridge and a shutter mechanism 11 are provided on the front face section of the casing 8, while a motor-driven fan 9 is provided on the rear face section of the casing 8 for cooling the inside of the casing 8. The space inside the casing 8 is cooled by a very small amount of air which passes through a gap in the shutter mechanism 11 for the disk insertion opening 10.

However, in such a conventional disk drive apparatus, the inside of the casing 8 is under a negative pressure, although small, resulting from the larger volume of air exhausted by the motor-driven fan 9 used for cooling than the amount of air flowing through the gap in the shutter mechanism 11. As a result, when the shutter mechanism 11 is opened in order that a disk cartridge is inserted or removed via the disk loading mechanism 7, there is a tendency for airborne contaminants such as dust and dirt in the ambient environment to enter the casing 8, which is a major problem. Specifically, when dust and dirt enter the apparatus, these impurities tend to adhere to an objective lens (omitted from the drawing) of the optical head, causing concern that reading and recording of signals will not be accurate.

SUMMARY OF THE INVENTION

An object of the present invention is to provide, with due consideration to the drawbacks of such conventional devices, an optical disk drive apparatus wherein dust and dirt in the ambient environment is effectively prevented from entering the apparatus while the inside of the apparatus is effectively cooled.

The object of the present invention is achieved by the provision of an optical disk drive apparatus comprising a casing or housing and a main chassis wherein the interior of the casing or housing is divided into a first space and a second space by means of the main chassis wherein an optical head, an optical disk loading mechanism, a turn table and a means for increasing the pressure in the first space are positioned in the first space; and an electrical equipment section, a power supply section and a means for cooling the second space are positioned in the second space.

BRIEF DESCRIPTION OF ACCOMPANYING DRAWINGS

DETAILED DESCRIPTION OF THE PREFERRED EMBODIMENTS

Figure 1:
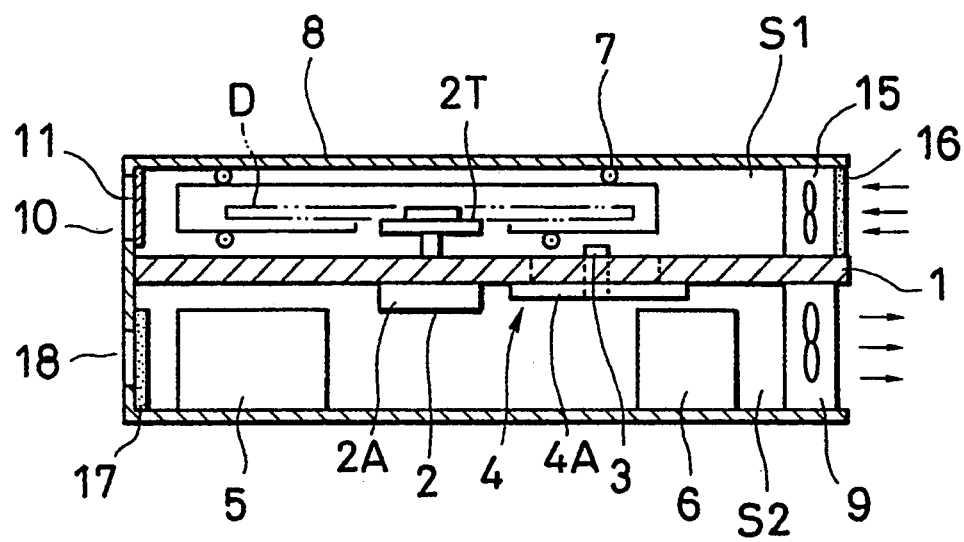
FIG. 1 is a cross sectional view of an embodiment of the optical disk apparatus according to the present invention.
Figure 2:
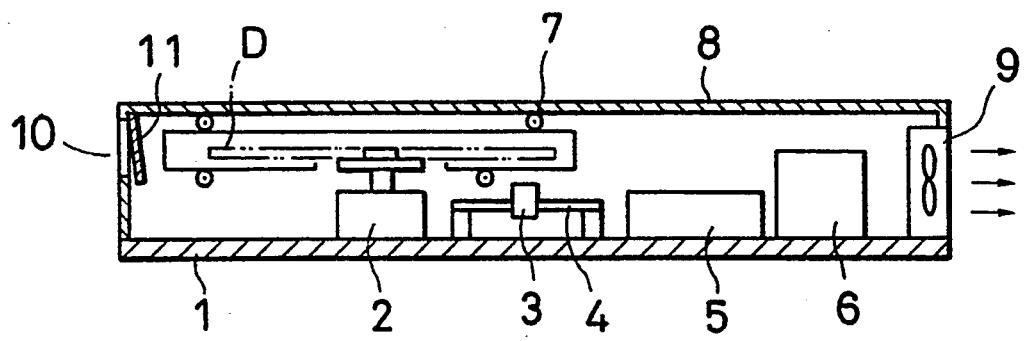
FIG. 2 is a cross sectional view of a conventional optical disk drive apparatus.

The optical disk apparatus of the present invention has a casing or housing the interior of which is divided by the main chassis into the first and second spaces and clean air is forceably caused to enter the first space, in which is positioned the optical head which is particularly sensitive to dust and dirt, so that the interior air pressure is increased. As a result, when the disk cartridge is inserted or removed, air flows from the shutter opening to the outside so that dust and dirt in the ambient environment is effectively prevented from entering. The electrical equipment section and the power supply section, which are heat generating components, are positioned in the second space, and the cooling fan effectively discharges this heat from the casing to cool this second space.

An embodiment of the present invention will now be explained with reference to the drawings. Parts which are identical to or correspond to parts in the conventional embodiment have been assigned the same reference numerals as the conventional embodiment.

FIG. 1 is a cross sectional view of an embodiment of the optical disk apparatus according to the present invention. In the drawing, the optical disk apparatus has an internal space which is defined or enclosed by a casing 8 or housing and divided into a first or upper space S1 and a second or lower space S2 partitioned by a main chassis 1 on which a spindle motor device 2 and a shifting mechanism 4 for an optical head are positioned.

Arranged in the first space S1 are a turntable 2T, an optical head 3 and a disk loading mechanism 7. The turntable 2T is driven by the rotation of the spindle motor device 2 via a spindle extending through the main chassis 1, and the optical head 3 is projected from the main chassis 1 and positioned by the optical head shifting mechanism 4 in the form of a linear motor device. The optical head shifting mechanism 4 is located in the second space S2. An optical disk cartridge D is loaded onto the turntable 2T by the disk loading mechanism 7.

An opening 10 for inserting the optical disk cartridge D, and a shutter mechanism 11 for covering the insertion opening 10 are formed on the front face section of the casing or housing 8 which defines the first space S1. Also, a motor-driven fan 15 which draws in outside air is positioned on the rear face section of the casing 8, and an air filter 16 is mounted in the suction port for the motor-driven fan 15.

The motor-driven fan 15 is provided as a means for increasing the air pressure within the first space S1 to a level higher than outside by forceably drawing in outside air so as to prevent the intake of dust and dirt in the ambient environment to the first space S1. The fan 15 need not always be run during normal operation. Specifically, for example, this fan 15 is connected to the shutter mechanism 11 and is operated only when the insertion opening 10 is open in order that the first space S1 is placed in flow communication with the ambient environment, while it is not operated at other times, therefore reducing power consumption.

An electrical equipment section 5 and a power supply section 6, which are the main heat generating devices, are positioned in the second space S2. In further detail, a motor 2A of the spindle motor device 2 mounted on the main chassis 1 and a linear motor section 4A of the optical head shifting mechanism 4 are also housed in the second space S2. This configuration provides a very convenient arrangement for cooling these components. Specifically, an air intake port 18 covered by an air filter 17 is provided on the front face section of the casing or housing 8 defining the second space S2, so that the second space S2 is open directly to the outside, and a motor-driven cooling fan 9 is provided on the rear face section of this casing or housing 8 to discharge the air inside the second space S2 to the outside. The heated air inside the second space S2 is thus continuously replaced with outside air.

The operation will now be explained.

The motor-driven cooling fan 9 operates when the power supply section 6 is ON, and discharges the air in the second space S2 to the outside. At the same time, outside air is drawn in, entering the second space S2 through the air intake port 18, so that cooling of the various electrical parts is commenced. Cooling is effectively carried out by the flow of air which is drawn from the outside and discharged to the outside, taking the heat from these various electrical parts in the second space S2, so that function deterioration, which would otherwise occur from an increase in temperature of the electrical equipment section 5 and the like, specifically semiconductors contained in it, can be prevented.

Next, the shutter mechanism 11 of the insertion opening 10 is opened and a disk cartridge is inserted into the disk loading mechanism 7. The motor-driven fan 15 is operated as the shutter mechanism 11 is opened. Outside air passes through the air filter 16 and is instantly fed into the first space S1. As a result, the first space S1 is filled with clean air from which airborne contaminants such as dust and dirt has been filtered out, and the pressure in the first space S1 is increased, so that the air flows out of the first space S1 to the outside through the open shutter mechanism 11. Accordingly, dust and dirt in the ambient environment is completely prevented from entering the first space S1. After the disk cartridge is inserted and the shutter mechanism 11 fully closed, there is, of course, no concern about dust and dirt entering, therefore the motor-driven fan 15 may be halted.

Also, when the optical disk cartridge D on the turntable 2T is removed through the disk loading mechanism 7, dust and dirt can be prevented from entering the first space S1 by operating the motor-driven fan 15 with the shutter mechanism 11 open as outlined above. Thus, the first space S1 can normally be maintained in a clean, dust-free condition and the objective lens on the optical head 3 is protected against contamination. The function of the objective lens is maintained in a best condition so that it is possible to read and record signals accurately.

In the above-described embodiment, the air filter 17 is installed in the air intake port 18 of the second space S2. However, the air filter 17 may be provided only if required, because the first space S1, in which is housed the parts of the optical disk D and the optical head 3 and the like which are particularly susceptible to contamination by dust and dirt, is divided and isolated from the second space S2 by the main chassis 1. Further, the air filter 17 can be installed in another manner other than in the embodiment.

In addition, with the above-described embodiment, the air intake port 18 through which air is drawn into the second space S2 is provided open directly to the outside of the casing or housing 8, but the embodiment is not restricted to this configuration. For example, the air intake port 18 may be provided through the main chassis 1 which separates the first space S1 and the second space S2, or may be provided in both the casing or housing 8 and the main chassis 1.

Also, in the above-described embodiment, the motor-driven fan 15 is used as the means for increasing the air pressure in the first space S1, but a compressor may be used in place of the motor-driven fan.

As explained in the foregoing, in the present invention the inside of the casing for the optical disk drive apparatus is divided into a first space and a second space. An optical head and an optical disk loading mechanism are positioned in the first space, an electrical equipment section and a power supply section are positioned in the second space, and a means for increasing the pressure in the first space is provided to prevent the entrance of dust and dirt into the first space from outside, while means such as a motor-driven fan is provided for cooling the second space. Accordingly, it is possible to effectively cool the electrical equipment section and the power supply section in the second space, as well as to prevent the optical head in the first space from being contaminated by dust and dirt. The operation of this optical disk drive apparatus can therefore be effectively maintained in a stable condition.

What is claimed is:

1. An optical disk drive apparatus comprising a housing having an interior, and a main chassis extending through the interior of the housing so that the interior of the housing is divided by means of the main chassis into a first space and a second space stacked vertically with respect to one another, the first space formed to house an optical head, an optical disk loading mechanism, a turn table and a means for increasing the pressure in the first space, and the second space formed to house an electrical equipment section, a power supply section and a means for cooling the second space.

2. The optical disk drive apparatus of claim 1, wherein the spindle motor and the mechanism for shifting the optical head are mounted to the main chassis.

3. The optical disk drive apparatus of claim 2, wherein the spindle motor has a spindle extending through the main chassis, and the turn table is connected to the spindle.

4. The optical disk drive apparatus of claim 2, wherein the optical head projects from the main chassis and connected through the main chassis to the mechanism for shifting the optical head.

5. The optical disk drive apparatus of claim 1, wherein the first space is isolated from the second space, and the means for cooling the second space is provided in flow communication with outside air.

6. The optical disk drive apparatus of claim 1, wherein the means for cooling the second space is provided through the main chassis, so that the first space is placed in flow communication with the second space.

7. An optical disk drive apparatus for a disk cartridge comprising a housing having an interior, and a main chassis extending through the interior of the housing so that the interior of the housing is divided by means of the main chassis into a first space and a second space stacked vertically with respect to one another, the first space formed to house an optical head, an optical disk loading mechanism, a turn table and a means for increasing the pressure in the first space, the second space formed to house an electrical equipment section, a power supply section and a means for cooling the second space, and wherein said means for increasing the pressure in the first space operates to increase the pressure during insertion and removal of the disk cartridge.

8. The optical disk drive apparatus of claim 7, further comprising an air filter arranged in said first space, said means for increasing the pressure operating to pass outside air through said air filter into the first space to increase the pressure.

* * * * *